(12) United States Patent
Donini et al.

(10) Patent No.: US 6,241,871 B1
(45) Date of Patent: Jun. 5, 2001

(54) ELECTROCHEMICAL OXIDATION OF HYDROGEN SULFIDE

(75) Inventors: John C. Donini, deceased, late of Sherwood Park, by Oreola Donini, legal representative; Karl T. Chuang, Edmonton; Stefan V. Slavov, Edmonton; Alan R. Sanger, Edmonton; Vesna Stanic, Edmonton, all of (CA)

(73) Assignee: Ethyl Tech Inc., Calgary (CA)

( * ) Notice: Subject to any disclaimer, the term of this patent is extended or adjusted under 35 U.S.C. 154(b) by 0 days.

(21) Appl. No.: 09/314,106

(22) Filed: May 19, 1999

Related U.S. Application Data (63) Continuation-in-part of application No. 09/061,109, filed on Apr. 16, 1998, now abandoned.

(51) Int. Cl.[7] .............................. C25C 1/00; C25B 1/02; C25B 11/04
(52) U.S. Cl. ........................................... 205/617; 205/639
(58) Field of Search .................................. 205/617, 637, 205/638, 639

(56) References Cited

U.S. PATENT DOCUMENTS

| | | |
|---|---|---|
| 3,249,522 | 5/1966 | Bolmer . |
| 3,874,930 | 4/1975 | Pohl et al. . |
| 4,544,461 | 10/1985 | Venkatesan et al. . |
| 4,859,292 | 8/1989 | Appleby . |
| 4,920,015 | 4/1990 | Sammells . |
| 5,520,793 | 5/1996 | Genders et al. . |
| 5,589,285 | 12/1996 | Cable et al. . |
| 5,908,545 | * 6/1999 | Donini et al. ........................ 205/617 |

OTHER PUBLICATIONS

Slavov, S.V. et al., "A Proton–Conducting Solid State $H_2S$—$O_2$ Fuel Cell. 1. Anode Catalysts, and Operation at Atmospheric Pressure and 20–90° C", International Journal of Hydrogen Energy, vol. 23, No. 12, Dec. 1, 1998, pp. 1203–1212.

Pujar, N.U. et al., "An Electrochemical Claus Process of Sulfur Recovery", Journal of the Electrochemical Society, vol. 136, No. 12, Dec. 1, 1989, pp. 3662–3678.

* cited by examiner

Primary Examiner—Donald R. Valentine (57) ABSTRACT

The invention relates to a process for gas phase electrochemical oxidation of $H_2S$ to sulfur and water or steam using an electrolysis cell having an anode chamber on one side of a solid proton conducting membrane and a cathode chamber on the other side of the membrane. The process comprises the steps of passing $H_2S$-containing gas through the anode chamber to contact a catalytic anode, where it reacts to produce elemental sulfur, protons and electrons. The protons pass through the membrane from the anode chamber to the cathode chamber. An oxygen-containing gas is passed through the cathode chamber to contact the catalytic cathode, where it reacts with protons and electrons to produce water or steam. During the process, both the anode chamber and cathode chamber are maintained at a temperature of at least 120° C. and an elevated pressure sufficient to keep the membrane moist. Sulfur is obtained in liquid or vapor form and is removed from the anode chamber while water or steam is removed from the cathode chamber. An electric current can be withdrawn from the anode and cathode. The cell can also be operated in the electrolysis mode to produce sulfur and hydrogen.

16 Claims, 5 Drawing Sheets

ELECTROCHEMICAL OXIDATION OF HYDROGEN SULFIDE

CROSS-REFERENCE TO RELATED APPLICATION

This application is a continuation-in-part of U.S. application Ser. No. 09/061,109, filed Apr. 16, 1998, now abandoned.

FIELD OF THE INVENTION

This invention relates to electrochemical $H_2S$ spontaneous conversion to sulfur and water with the concurrent production of electrical energy or to sulfur and hydrogen.

DESCRIPTION OF THE PRIOR ART

Hydrogen sulfide ($H_2S$) is a corrosive and extremely toxic gas that is present in natural gas wells at concentrations ranging from a few ppm to 50% or even higher. Hydrodesulfurization of heavy oil and bitumen and coal gasification also produce gas streams containing hydrogen sulfide as an undesirable by-product. At present the approach to removal of $H_2S$ has been to destroy it by oxidation to steam and sulfur, and not to utilize $H_2S$ as a hydrogen resource.

A number of processes are available for the removal of $H_2S$ from natural gas and process gas streams, and for converting it into useful or at least harmless products. Most of these methods are multistage processes that begin with chemical or physical absorption of $H_2S$. In practice, $H_2S$ is usually removed by contacting the process gas with a thin film of a basic organic solvent. The solvent is regenerated by heating in a second unit, and the $H_2S$ evolved is destroyed using the well-established Claus process. In this process part of the $H_2S$ is oxidized yielding $SO_2$ and $H_2O$. The $SO_2$ then reacts with further stoichiometric amounts of $H_2S$ over an alumina based catalyst to produce elemental sulfur, water and heat. The overall chemical reaction occurs at 525–700° C., and can be summarized as follows:

$$\tfrac{1}{3} H_2S + \tfrac{1}{2} O_2 \rightarrow \tfrac{1}{3} SO_2 + \tfrac{1}{3} H_2O \quad (1)$$

$$\tfrac{2}{3} H_2S + \tfrac{1}{3} SO_2 \rightarrow S + \tfrac{2}{3} H_2O \quad (2)$$

Net reaction:

$$H_2S + \tfrac{1}{2} O_2 \rightarrow S + H_2O + Q \quad (3)$$

Although the Claus process is exothermic and generates thermal energy, the heat is generally not utilized and therefore has no economic value. Electrolysis of $H_2S$ solutions has been considered to be an attractive alternative strategy, due to more favourable thermodynamics compared to water electrolysis. Neither this, nor other approaches recovering hydrogen using thermal catalytic decomposition and membranes for separation, has been commercialized yet, which is partly due to an overall net energy input being required. A far more desirable strategy is to directly electrochemically oxidize hydrogen originating from the $H_2S$ decomposition reaction. In such a manner, a fuel cell using $H_2S$ as the feed would generate electrical energy, leaving only sulfur and water as environmentally acceptable product.

There is very little literature information pertaining to electrochemical oxidation of gas phase $H_2S$ in a fuel cell. A fuel cell using a fuel containing $H_2S$ is described in Pohl et al., U.S. Pat. No. 3,874,930. The electrolyte was a mineral acid, and the anode comprised $MoS_2$ or $WS_2$ admixed with a conductive material. Work has recently been reported in which both yttria- and calcia-stabilized zirconia were used as a solid oxygen ion-conducting electrolyte operated at 900° C. Practical cell voltages were below 0.9 V at current densities of only a few mA. The problem of producing undesirable by-product $SO_2$ has not been eliminated.

The potential applications of solid state, oxygen ion-conducting membranes for oxidation of $H_2S$ to sulfur has been described in Sammells, U.S. Pat. No. 4,920,015. The same group has investigated the use of mixed (oxygen-anion and proton) solid conductors in an "electrochemical Claus process". The findings indicate the possibility that there exists a reforming mechanism to give hydrogen, which subsequently reacts as fuel at the anode. There was a significant decrease in cell voltage when the $H_2S$ content in inert gas was increased. This finding suggests that elemental sulfur covers the electrocatalytic sites and limits diffusion currents for hydrogen oxidation.

Venkatesan et al., U.S. Pat. No. 4,544,461, aluminosilicate materials (zeolites) were used both as proton conductors and catalytic materials in a $H_2S$—$O_2$ fuel cell. Cell temperatures were <370° C., which appears to be of crucial importance for zeolite conductivity. It was stated that aluminosilicates can be activated to a satisfactory conductivity by partial removal of water. The maximum electromotive force obtained was 0.35 V. The disadvantage of the design seems to be that the porous zeolite structure cannot ensure both high enough conductivity and gas impermeability. In a related system, $Li_2SO_4$ was tested as a proton-conducting electrolyte in a 700° C. $H_2S$—$O_2$ fuel cell.

From the above description of the prior art, it can be seen that dissociation of $H_2S$ exclusively to its elements has not previously been achieved with high efficiency. Thus, no economically viable system has heretofore existed for the electrochemical oxidation of $H_2S$ exclusively to sulfur and steam with generation of electrical power.

DESCRIPTION OF THE PRIOR ART

One embodiment of the present invention relates to a process for gas phase electrochemical oxidation of $H_2S$ to sulfur and water or steam using an electrolysis cell having an anode chamber on one side of a solid proton conducting membrane and a cathode chamber on the other side of the membrane. The process comprises the steps of passing $H_2S$-containing gas through the anode chamber to contact a catalytic anode, where it reacts to produce elemental sulfur, protons and electrons. The protons pass through the membrane from the anode chamber to the cathode chamber. An oxygen-containing gas is passed through the cathode chamber to contact the catalytic cathode, where it reacts with protons and electrons to produce water or steam. During the process, both the anode chamber and cathode chamber are maintained at a temperature of at least 120° C. and an elevated pressure sufficient to keep the membrane moist. Sulfur is obtained in liquid or vapour form and is removed from the anode chamber while water or steam is removed from the cathode chamber. An electric current can be withdrawn from the anode and cathode.

The solid proton conducting membrane may be made from a variety of materials, such as perfluorosulfonic acid or polybenzimidazole. A particularly effective proton conducting membrane is the perfluorosulfonic acid product sold under the trade mark Nafion®.

The anode and cathode may be formed from a variety of different materials, such as carbon products and electrodes made of compressed carbon powder have been found to be particularly effective. These are loaded with a metal catalyst, which may be selected from a large variety of metals, such as Mo, Co, Pt, Pd, Cu, Cr, W, Ni, Fe, Mn, etc. Preferably, the catalyst except Pt and Pd is in the sulfide form. The body of the electrolysis cell may also be formed from a variety of materials such as Teflon, carbon block, metal, etc. Preferably the body of the electrolysis cell is metal for operation at high temperature and pressure.

A preferred anode catalyst according to the invention is a metal sulfide prepared by the sol-gel technique (S. T. Srinivasan, P. Kanta Rao, "Synthesis, Characterization and Activity Studies of Carbon Supported Platinum Alloy Catalysts", *Journal of Catalysis,* 179 (1998) 1–17). Using the sol-gel technique, the metal sulfide is deposited on carbon in a very highly dispersed state. Thus, the particles of active material are each small and well dispersed over all the surface of the carbon. The result of this well dispersed array of very small particles is an increased surface of active catalyst. Moreover, each particle is intimately in contact with the support rather than simply admixed with the carbon. This affects both the chemistry of the particles and the capability to transfer electrons and protons within the anode.

The basic fuel cell according to the invention has the following configuration:

$$H_2S/anode/solid\ electrolyte/cathode/O_2(g)$$

The essential components of the reaction mechanism are as follows:

$$Anode\ H_2S \rightarrow S+2H^++2e^-$$

$$Cathode\ \tfrac{1}{2}O_2+2H^++2e^- \rightarrow H_2O$$

$$Cell\ H_2S+\tfrac{1}{2}O_2 \rightarrow S+H_2O$$

It is also in accordance with this invention possible to operate the cell only in an electrolysis mode to produce sulfur and hydrogen. When operated in the electrolysis mode, the gas being fed to the cathode chamber is an inert gas such as argon or nitrogen rather than oxygen.

It has been found that the most effective method of operating the electrolysis cell is at temperatures above the melting point of sulfur, preferably in the range of 125–165° C., and at pressures sufficiently high to ensure the presence of liquid phase water within the Nafion membrane. The pressure to achieve this is usually at least about 20 psig (0.14 MPa) and is preferably in the range of about 20 to 60 psig (0.14 to 0.41 MPa).

BRIEF DESCRIPTION OF THE DRAWINGS

The above and further advantages of this invention will be seen in reading of the description of the preferred embodiments together with reference to the drawings wherein.

DESCRIPTION OF THE PREFERRED EMBODIMENTS

Figure 1:
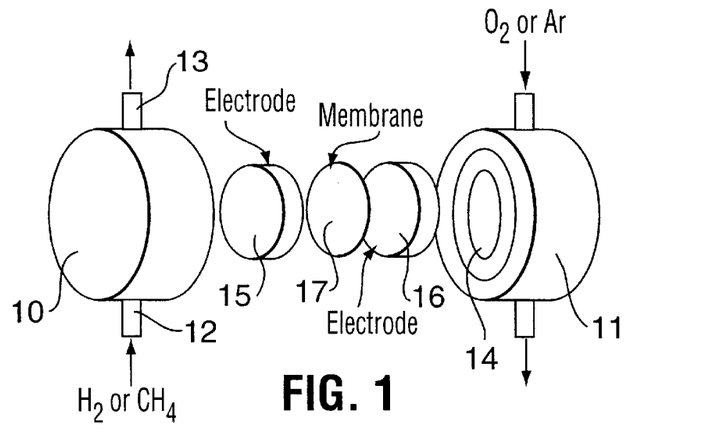
FIG. 1 is a schematic representation of one embodiment of an electrolysis cell for use according to the invention.

FIG. 1 shows an electrolysis cell having body portions 10 and 11, each with a flow inlet connector 12 and a flow outlet connector 13. Each body portion also has a body cavity 14 connected to the flow connectors 12 and 13. Electrodes 15 and 16 fit within recesses in the body cavities with membrane 17 held between the electrodes 15 and 16.

Figure 2:
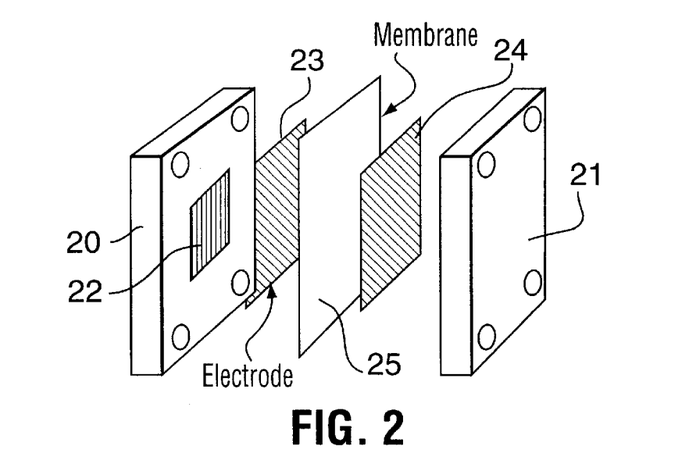
FIG. 2 is a schematic representation of a further electrolysis cell.

An alternative design of electrolysis cell, made from a carbon block, is shown in FIG. 2. In this embodiment, a pair of carbon blocks 20 and 21 are used to form the body of the electrolysis cell. Slots 22 are provided in the carbon blocks to provide flow to the electrodes 23 and 24 which are held between the blocks 20 and 21. A membrane 25 is held between the electrodes 23 and 24 to complete the cell. This cell design is generally not adaptable to a wide range of conditions.

Figure 3:
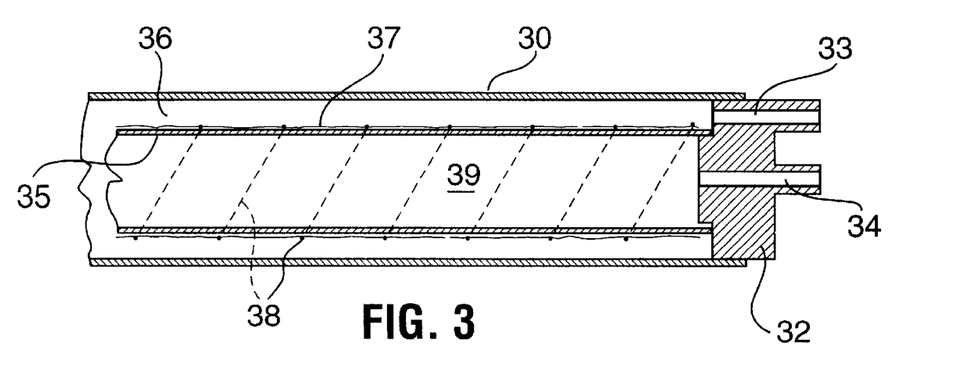
FIG. 3 is a schematic representation of a high pressure, high temperature, tubular electrolysis cell.

A high temperature, high pressure tubular cell is shown in FIG. 3. This consists of an outer tubular casting body 30 having end inserts 32 to provide flow connectors 33 and 34 which are insulated from the tube 30. The inserts 32 may be held in place by end compression nuts, not shown.

Mounted coaxially within tube 30 is a porous metal, e.g. nickel tube 35 of smaller diameter than tube 30 so as to provide an annular space 36 between porous nickel tube 35 and outer casing 30. A layer comprising a proton conducting membrane is formed on the outside surface of the nickel tube 35, sealing the pores of the tube. A nickel mesh 37 is wrapped around the tube 35, this mesh supporting a metal catalyst. The mesh is tightly wrapped onto the tube using a nickel wire 38 which also acts as the electrical contact. This embodiment provides a design of generally tubular configuration with a tubular membrane. An anode catalyst is on the outside of the membrane and a cathode catalyst is on the inside of the membrane. Thus, the annular space 36 is the anode chamber and the central space 39 is the cathode chamber.

Figure 4:
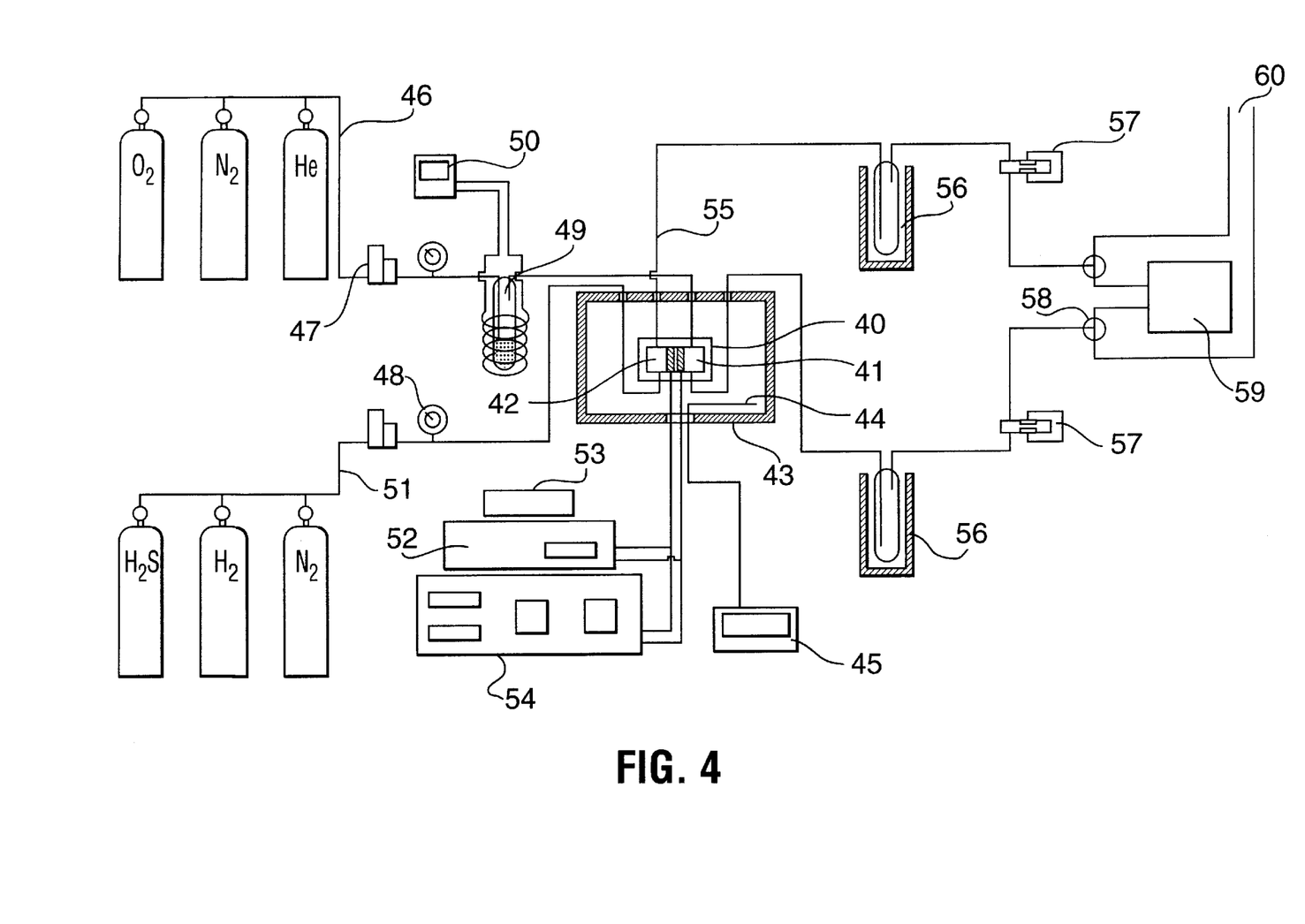
FIG. 4 is a schematic flow sheet of an experimental electrolysis system.

FIG. 4 shows an experimental system for the electrochemical oxidation of $H_2S$. The heart of this system is an electrochemical cell 40 which includes a cathode chamber 41 and an anode chamber 42 divided by a membrane. The cell is placed within an oven 43 for maintaining a constant temperature. That temperature is controlled by means of a thermocouple 44 and a temperature controller 45 for a heating system (not shown).

Gas is fed to the cathode chamber by means of feed line 46 with the flow being controlled by flow controller 47 and manometer 48. Also included within this gas feed system to the cathode chamber are a heated water vapour saturator 49 and a current transformer 50. The gas to the anode chamber is fed through line 51 with the flow also being controlled by means of a flow controller and manometer.

For controlling the electrochemical cell, there are attached to it a volt meter 52, decade resistance box 53 and a potentiostat 54.

The product material from the anode chamber is discharged through line 55 through trap 56 and metering back pressure valve 57. The discharge is preferably arranged so that liquid sulfur can drain by gravity flow. Thus, the cell is preferably arranged in a vertical configuration. A three way valve 58 permits discharge either through gas chromatograph 59 or vent 60.

The discharge from the cathode chamber 41 is through line 61 which also passes through a trap 56 and a metering back pressure valve 57. This line also connects either to gas chromatograph 59 or vent 60 via a three way valve 58.

EXAMPLE 1

Catalytic electrodes were prepared using the active catalysts Pd, Pt and $MoS_2$. Catalysts materials were prepared consisting of:

(a) 10% Pt/Vulcan XC-72R carbon (Alfa, Aesar)

(b) 20% Pd/activated carbon powder, unreduced (Alfa, Aesar)

(c) $MoS_2$/black powder (Alfa, Aesar)

These were mixed with 35% Teflon-treated carbon black (Shawinigan acetylene carbon black C-100, Chevron Chemical Corp.) to produce the electrodes. The mixture was then compressed in a mould to form the electrode. The catalytic anodes and cathodes had the compositions shown in Table 1 below.

TABLE 1

|  | Anode Catalyst | Cathode Catalyst |
| --- | --- | --- |
| Sample Pd Anode Catalysts |  |  |
| P.02 | 12.22% Pd/C | 2.16% Pt/C |
| P.03 | 7.83% Pd/C | 2.55% Pt/C |
| P.04 | 8.35% Pd/C | 2.16% Pt/C |
| P.05 | 9.94% Pd/C | 2.46% Pt/C |
| P.12 | 9.54% Pd/C | 2.37% Pt/C |
| P.14 | 9.88% Pd/C | 2.05% Pt/C |
| $MoS_2$ Anode Catalysts |  |  |
| P.06 | 66.52% $MoS_2$/C | 2.52% Pt/C |
| P.07 | 62.47% $MoS_2$/C | 2.27% Pt/C |
| P.08 | 62.04% $MoS_2$/C | 2.41% Pt/C |
| P.09 | 65.78% $MoS_2$/C | 2.75% Pt/C |
| P.10 | 67.31% $MoS_2$/C | 2.22% Pt/C |
| P.11 | 66.27% $MoS_2$/C | 2.23% Pt/C |
| P.13 | 60.18% $MoS_2$/C | 2.20% Pt/C |
| Pt Anode Catalysts |  |  |
| P.01 | 5.96% Pt/C | 2.16% Pt/C |
| P.15 | 4.53% Pt/C | 2.08% Pt/C |

The membrane-electrode assemblies, which are the principal components of the system, were obtained by pressing porous electrode materials on both sides of a proton exchange membrane. The membrane used was the commercially available perfluorosulfonic acid membrane Nation® from DuPont.

EXAMPLE 2

Figure 5:
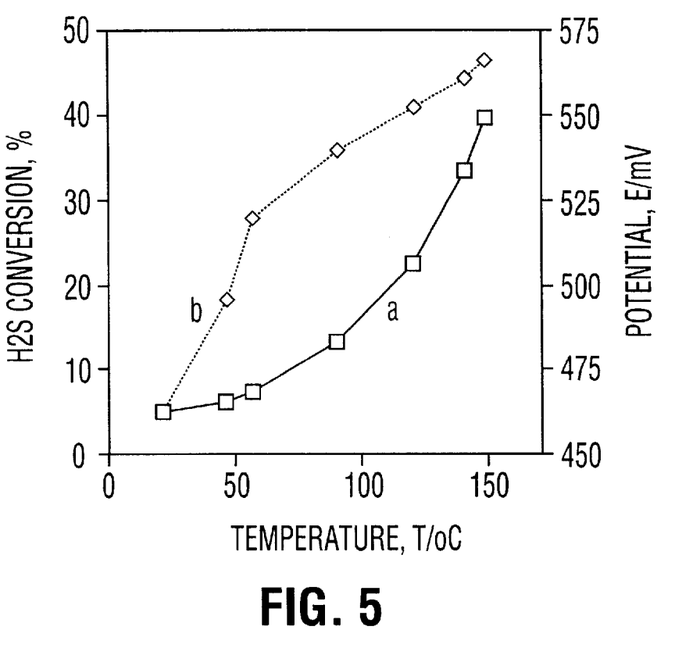
FIG. 5 is a plot of $H_2S$ conversion and potential as a function of time.

A test was conducted on the electrolysis system of FIG. 4 to determine the dependence of potential and $H_2S$ conversion as a function of temperature. It was operated as a $H_2S/O_2$ fuel cell with a 60.24% $MoS_2$/C anode catalyst and a 2.41% Pt/C cathode catalyst (P.08 above). The cell was operated at a pressure of 52 psi (0.36 MPa) and at varying temperatures up to 150° C. The results are illustrated in FIG. 5, which clearly shows the favourable effect of operation at high temperatures, curve (a) showing conversion and (b) showing potential.

EXAMPLE 3

Figure 6:
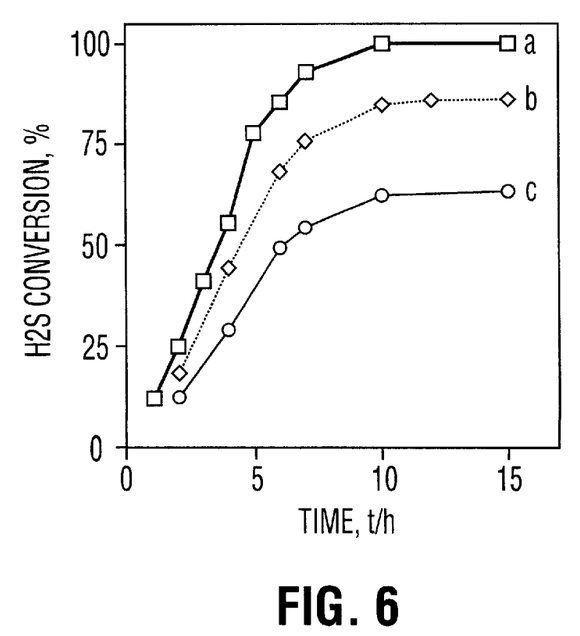
FIG. 6 is a plot of $H_2S$ conversion as a function of time at different gas flow rates.

The relationship of $H_2S$ conversion to anode compartment feed gas flow rate was studied on the system of FIG. 4 at operating as a $H_2S/O_2$ fuel cell at conditions of 145° C. and 52 psig (0.36 MPa). For this test, a 9.88% Pd/C anode 2.05% Pt/C catalyst and cathode catalyst combination (P.14) of Table 1 was used. The tests were carried out at flow rates of 4 cm/min, 9 $cm^3$/min and 16 $cm^3$/min and the results obtained are shown in FIG. 6, with curve (a) being 4 $cm^3$/min, (b) 9 $cm^3$/min and (c) 16 $cm^3$/min.

EXAMPLE 4

Figure 7:
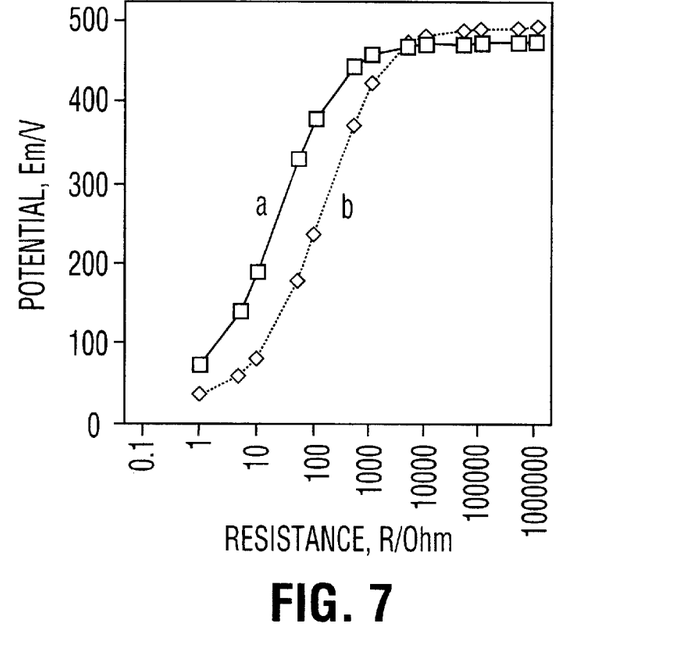
FIG. 7 is a plot of potential as a function of resistance.

In order to determine the stainable operability of the $H_2S/O_2$ fuel cell, tests were conducted on the system of FIG. 4 over an extended period while measuring the potential as a function of resistance in the external circuit. The 7.83% Pd/C anode and 2.55% Pt/C cathode catalyst combination (P.03) of Table 1 was used and the fuel cell was operated at a temperature of 125° C. and a pressure 40 psig (0.275 MPa). The results are shown in FIG. 7 with the curve (a) being for fresh catalyst and curve (b) after 36 hours in operation. The results clearly demonstrate the reliability of the high temperature, high pressure operation of this system.

EXAMPLE 5

Figure 8:
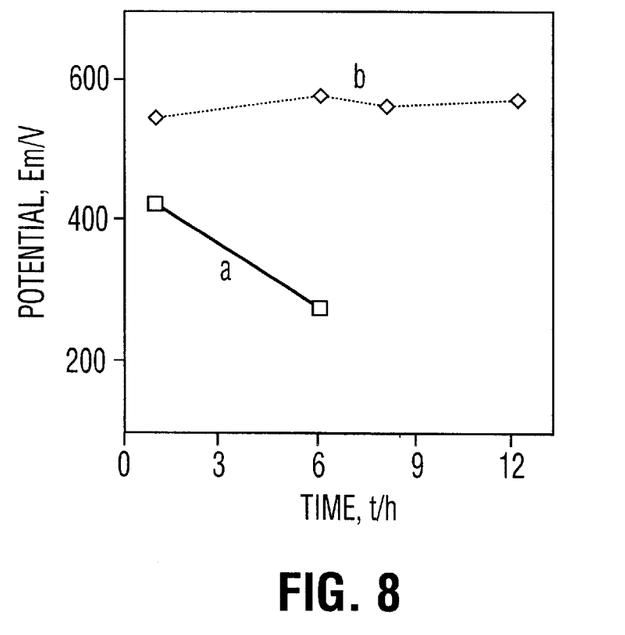
FIG. 8 is a plot of potential as a function of time at different temperatures and pressures.

A further test was carried out on the system of FIG. 4 to examine the relationship of potential in a fuel cell as a function of operating time. For this test, results were compared for operating the $H_2S/O_2$ fuel cell at room temperature and atmospheric pressure in one case and at 145° C. and 50 psig (0.345 MPa) in the other case. The room temperature test was carried out using as anode catalyst 80% $MoS_2$/C, while the test at elevated temperature and pressure was carried out using a 62.47% $MoS_2$/C anode catalyst and 2.27% Pt/C cathode catalyst combination (P.07) from Table 1. The results are shown in FIG. 8, with curve (a) at room temperature and atmospheric pressure and (b) at 145° C. and 50 psig (0.345 MPa). These results clearly show the reliability of the high temperature, high pressure operation.

EXAMPLE 6

Figure 9:
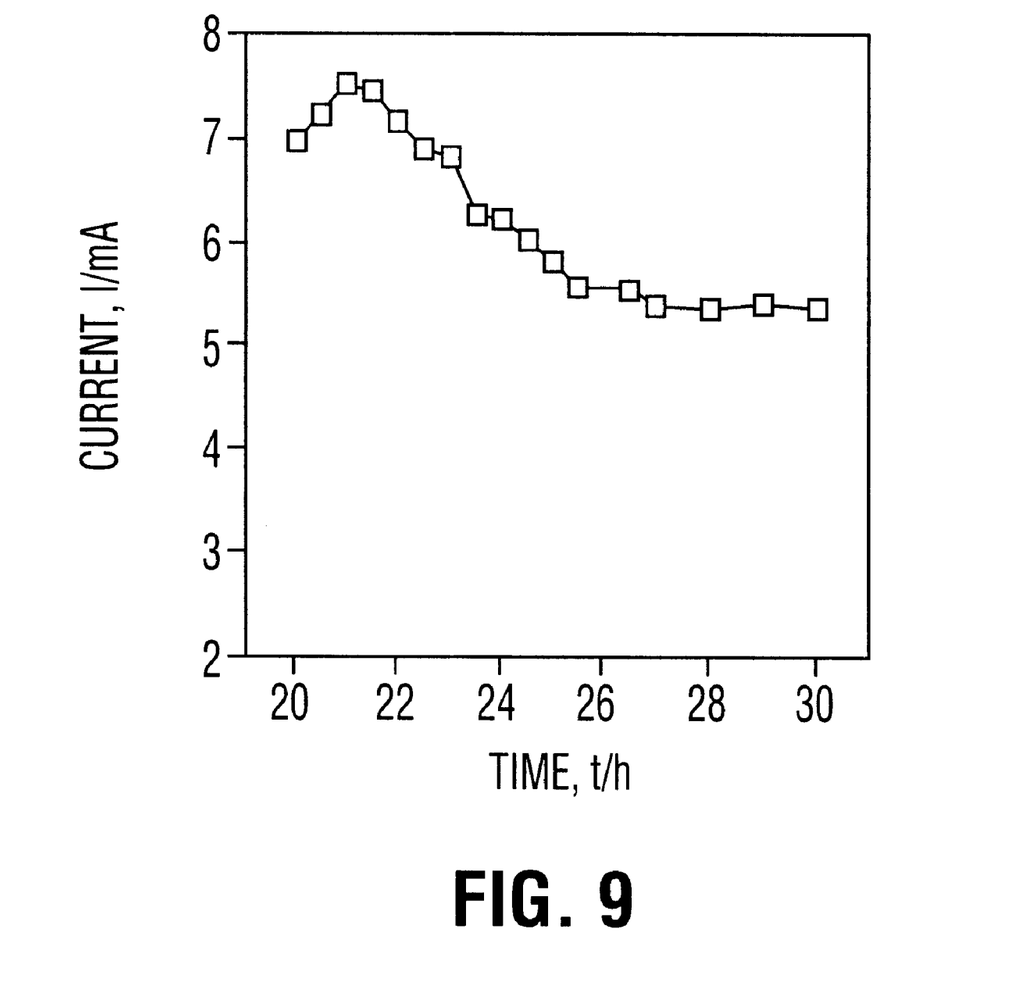
FIG. 9 is a plot of current as a function of potential applied for an electrolysis cell.

The system of FIG. 4 was operated in the electrolysis mode to determine the relationship of current as a function of time over an extended operating period at a constant applied potential. For this test, the 7.83% Pd/C anode catalyst and 2.55 Pt/C cathode catalyst (P.03) of Table 1 was used with the cell being operated at a temperature of 125° C. and a pressure of 40 psig (0.275 MPa). A constant potential of 600 mV was applied. The cell was operated for 30 hours with $H_2S$ being fed to the anode chamber and the atmosphere in the cathode compartment being switched to nitrogen for the electrolysis mode. The results are shown in FIG. 9, which show an average sustainable current of about 6.5 mA.

EXAMPLE 7

A series of additional catalysts were prepared and tested in a $H_2S/O_2$ fuel cell. A laboratory cell was used having a circular design with an active area of about 3 $cm^2$. A stainless steel mesh was used as a membrane electrode assembly support and as current collectors.

The tests were conducted using both commercially available materials and specially synthesized catalysts.

1. Catalyst Preparation a) $MS_x$/C

The carbon supported metal sulfide catalysts, $MoS_x$/C and $CoS_x$/C (initial composition x~2.5 in each case), were prepared by a sol-gel method combined with a wet impregnation technique. The method will be explained with respect to $MoS_x$/C.

Carbon Powder (Shawinigan Acetylene Carbon Black C-100, Chevron Chemical Corp.) was suspended in 2-propanol (Fisher Scientific, HPLC) grade and stirred for 15 min. After purging the reaction vessel containing the suspension with $N_2$ Molybdenum(V) isopropoxide (Alfa Æsar, 99.6% metal basis, 5% w/v in 2-propanol) was added to the mixture. It was stirred for an additional 15 min and then hydrogen sulfide gas was introduced into the mixture. When the mixture gelled, the $H_2S$ supply was stopped and the reaction vessel closed. The gel was aged for 48 h and then opened to air to evaporate the solvent. The catalyst contains 10 wt % molybdenum.

b) $MoCoS_x/C$

Dried $MoS_x/C$ was used as a substrate for $CoS_x$ (x~1.5) deposition. Cobalt sulfide was then precipitated on the substrate either by wet impregnation or combined sol-gel-wet impregnation method.

The precursor for the wet impregnation synthesis was Co(III) acetyl acetone (Aldrich, 98%). An appropriate amount of the reagent was dissolved in acetone (Fisher Scientific, HPLC grade). $MoS_x$ was added into this solution and stirred for 30 min. $H_2S$ gas was then bubbled through the suspension at 5 ml/min for 1 h, after which the suspension was closed and left to settle for 72 h. The clear solution formed above the precipitate was decanted and the precipitate filtrated It was filtrated under vacuum through a Buchner funnel using a Whatman #40 filter paper. The cobalt sulfide/carbon precipitate was washed with acetone first, and then with about 200 ml deionized water, placed on a glass plate and left to dry in an oven at 105° C. overnight. The prepared catalyst contained 30 wt % Co.

The precipitation of the $CoS_x$ on $MoS_x/C$ by combined sol-gel and wet impregnation methods was carried on the same way as $MoS_x/C$, described above. The reagent used was Co(V) methoxyethoxide (Alfa Æsar, 99.5% metal basis, 5% w/v in 2-methoxy ethanol).

c) $CuFeS_x/C$

The carbon supported copper iron sulfide catalyst was prepared by the wet precipitation impregnation method. The catalyst was synthesized in acidic aqueous solution, pH≈5, from $Cu(NO_3)_2 \cdot 2\frac{1}{2}H_2O$ (Fisher Scientific, 98%), $FeCl_3$ (Alfa Æsar, 98%, anhydrous) and hydrogen sulfide.

The reagents, cupric nitrate and iron chloride, were dissolved in water. The pH was adjusted to 5 with 1N HCl. Carbon powder (Shawinigan Acetylene Carbon Black CB-100, Chevron Chemical Co.) and 5 ml of ethanol (Fisher Scientific, HPLC) were added into the solution. The suspension was stirred for 30 min before $H_2S$ was introduced. The gas was bubbled. Then, the reaction vessel was closed and left for 72 h for the sulfides to precipitate. A supernatant liquid which formed was decanted and the sediment filtrated under vacuum. It was washed with 3×100 mL deionized water, until the filtrate showed pH=7. The carbon-supported catalyst was dried in an oven at 105° C. overnight.

d) 40% Pt/C

This catalyst was prepared by wet impregnation method. A commercially available catalyst, 10% Pt on Vulcan XC-72R carbon (Alfa Æsar) was used as a support for a new catalyst with higher loading of Pt. Thus, an appropriate amount of 10% Pt/C was suspended in acetone and stirred for 15 min A Pt(II) acetylacetone (Strem Chemicals, 98%) solution in acetone was added into the suspension. It was stirred on a hot plate at about 50° C. until menisci disappeared. The mixture was left to partially dry in air, where it was occasionally stirred with a glass rod. To dry completely, it was placed in an oven at 80° C. for 1 h. The 40% Pt/C catalyst was finely ground in a mortar.

2. Preparation of the electrodes

The $H_2S/O_2$ fuel cell electrodes, the anode and the cathode, consist of a chemically active component, a catalyst, and an electron conductive component, carbon powder. In addition, polytetrafluoroethylene (Teflon®, Aldrich, 60 wt % dispersion in water) is added to increase hydrophobicity of the electrodes and their mechanical properties. Two methods were used for the preparations of the electrodes: pressing of dry powders and deposition of the powder suspension by filtration. The different electrodes and their methods of preparation are set out in Table II.

a) Preparation of electrodes by powder pressing

All the anodes prepared by powder pressing were made from the same amount of the commercially available catalysts and already teflonized carbon black. The procedure for the carbon teflonization was described previously. For the electrodes described, the same lot of 35 wt % teflonized carbon powder (Shawinigan Acetylene Carbon Black CB-100, Chevron Chemical Co.) was used. Therefore, 60 wt % of a catalyst and 40 wt % of the teflonized carbon powder was thoroughly mixed in a beaker with a glass rod. The mixture was pressed in a 25.4 mm stainless steel die at pressure 14 MPa The anode thickness is about 0.5 mm.

The cathodes prepared by powder pressing are the same for all described membrane electrode assemblies (MEA). They were prepared from a homogenous mixture of 10% Pt/C and 35% teflonized carbon. They were pressed in the same die under the same pressure as the anodes. The thickness of the cathodes is 0.5 mm.

b) Preparation of electrodes by filtration

The thickness of the electrodes prepared by this method is ≦0.050 mm. Moreover, a carbon cloth used as a substrate for the electrode deposition is a current collector at the same time. To have a current collector and the anode in a such close contact is advantageous since accumulation of liquid sulfur between the electrode and collector is prevented.

The electrodes consist of teflonized catalyst. Teflonization of the catalyst, either metal sulfides supported on carbon used for the anodes or 40% Pt/C used for the cathodes, was carried out in the same manner as the previously described carbon powder teflonization. The suspensions prepared from the teflonized catalysts were deposited over the carbon cloth (GC-80 graphite cloth, Electrosynthesis Co.) substrates by filtration under vacuum. The deposited layer was flattened, dried in air and placed in a furnace at about 350° C. for 30 min.

3. Membrane Electrode Assembly (MEA) preparation

A solid polymer membrane Nafion® 117 (Aldrich) was used as a proton conductive electrolyte. Before bonding to the electrodes, it was treated in concentrated nitric acid for 30 min, washed with deionized water and soaked in 1N $H_2SO_4$ for 30 min. The membrane was washed in deionized water again and left to dry in air.

The electrodes were coated with dissolved Nafion® (Aldrich, 5 wt % Nafion® in alcohol-water solution) before they were attached to the membrane. Only one side of each of the electrodes was covered with the Nafion® solution and then allowed to dry. The electrodes were hot pressed to the membrane at pressure of 0.5 MPa and temperature 130° C.

Results

The anodes and cathodes were then tested in the laboratory cell. The fuel cell was operated on pure hydrogen sulfide (Liquid Air, 99.8% $H_2S$) and pure oxygen (Liquid Air, 99.8% $O_2$) at 3 atm (0.3 MPa) gas pressure and 130° C. Only oxygen was passed through a water bath in order to keep the membrane humidified. The dc electric parameters of the cell were measured for each MEA. The current-voltage characteristic of the cell was measured at regular intervals (i.e., every hour). Mean time, the cell was operated at open circuit mode. During a long-term experiment the cell was run at a constant load resistance of 1Ω. The experiments were carried out for 4–48 hours under such load. The results of the open circuit potential ($E_{OC}$), the electrical current (J) measured at 1Ω and the maximum power ($W_{max}$) for various membrane electrode assemblies are presented in Table III.

From these results, it can be seen that an anode catalyst prepared by the sol-gel technique provides a generally improved performance of the membrane electrode assembly, as compared to a catalyst prepared as a simple admixture. This is particularly significant with respect to the current density.

the membrane moist and liquid sulfur is removed from the anode chamber and water or hydrogen is removed from the cathode chamber.

2. A process according to claim 1 characterized in that an oxygen-containing gas is passed through the cathode chamber to contact a catalytic cathode, where it reacts with protons and electrons producing water or steam and removing the water or steam from the cathode chamber.

3. A process according to claim 1 characterized in that hydrogen is formed in the cathode chamber.

4. A process according to claim 3 characterized in that the cathode chamber comprises an inert gas atmosphere.

5. A process according to claim 1 characterized in that an electric current is withdrawn from said anode and cathode.

TABLE II

Catalyst content in the electrodes and the ways of the catalyst and the electrode preparations (CA-commercially available, LAB-synthesized in our laboratory, F-filtration, PP-powder pressing).

| MEA | ANODE CONTENT (mg/cm$^2$) | ANODE CATALYST PREP. | ANODE PREP. | CATHODE CONTENT (mg/cm$^2$) | CATHODE CATALYST PREP. | CATHODE PREP. |
|---|---|---|---|---|---|---|
| B 2 | 60 CuS$_2$ | CA | PP | 4 Pt/C | PP | CA |
| B 3 | 60 Cr$_2$S$_3$ | CA | PP | 4 Pt/C | PP | CA |
| B 4 | 60 WS$_2$ | CA | PP | 4 Pt/C | PP | CA |
| B 5M | 60 NiS$_2$ | CA | PP | 1.2 Pt/C | F | LAB |
| B 6 | 60 FeS | CA | PP | 4 Pt/C | PP | CA |
| GDE 8 | 1.1 MoS$_x$/C | LAB | F | 1.2 Pt/C | F | LAB |
| GDE 14 | 5.1 MoCoS$_x$/C | LAB | F | 1.2 Pt/C | F | LAB |
| GDE 16 | 5.0 CuFeS$_x$/C | LAB | F | 1.2 Pt/C | F | LAB |
| GDE 21 | 5.8 MoCoS$_x$/C | LAB | F | 1.2 Pt/C | F | LAB |
| GDE 22 | 6.2 CoS$_x$/C | LAB | F | 1.2 Pt/C | F | LAB |

TABLE III

| MEA | $E_{oc}$(mV) | J(mA/cm$^2$) | $W_{max}$(mW/cm$^2$) |
|---|---|---|---|
| B 2 | 656 | 72 | 5 |
| B 3 | 496 | 144 | 21 |
| B 4 | 460 | 44 | 2 |
| B 5M | 758 | 176 | 31 |
| B 6 | 552 | 56 | 3 |
| GDE 8 | 699 | 30 | 1 |
| GDE 14 | 608 | 104 | 11 |
| GDE 16 | 525 | 110 | 12 |
| GDE 21 | 713 | 200 | 40 |
| GDE 22 | 585 | 7 | <1 |

What is claimed is:

1. A process for gas phase electrochemical oxidation of H$_2$S to sulfur and water or hydrogen using an electrolysis cell having an anode chamber on one side of a solid proton conducting membrane and a cathode chamber on the other side of said membrane, said process comprising:

passing H$_2$S-containing gas through said anode chamber to contact a catalytic anode, where it reacts to produce elemental sulfur, protons and electrons;

passing protons through said membrane from the anode chamber to the cathode chamber;

and either passing an oxygen-containing gas through the cathode chamber to contact a catalytic cathode, where it reacts with protons and electrons producing water or forming hydrogen in the cathode chamber;

characterized in that both the anode chamber and the cathode chamber are maintained at a temperature of at least 120° C. and an elevated pressure sufficient to keep 6. A process according to claim 1 characterized in that the anode catalyst includes at least one metal selected from the group consisting of Mo, Co, Pt, Pd, Ni and Fe.

7. A process according to claim 1 characterized in that the catalytic anode is formed of pressed carbon powder containing the catalyst.

8. A process according to claim 7 characterized in that the carbon powder is treated with polytetrafluoroethylene.

9. A process according to claim 1 characterized in that the membrane is formed from perfluorosulfonic acid or polybenzimidazole.

10. A process according to claim 1 characterized in that the cathode is also formed of pressed carbon powder loaded with a catalyst.

11. A process according to claim 10 characterized in that the catalyst is platinum.

12. A process for gas phase electrochemical oxidation of H$_2$S to sulfur and water or hydrogen using an electrolysis cell having an anode chamber on one side of a solid proton conducting membrane and a cathode chamber on the other side of said membrane, said process comprising:

passing H$_2$S-containing gas through said anode chamber to contact a catalytic anode, where it reacts to produce elemental sulfur, protons and electrons;

passing protons through said membrane from the anode chamber to the cathode chamber;

and either forming hydrogen in the cathode chamber or passing an oxygen-containing gas through the cathode chamber to contact a catalytic cathode, where it reacts with protons and electrons producing water in the cathode chamber;

characterized in that both the anode chamber and the cathode chamber are maintained at a temperature of at least 120° C. and an elevated pressure sufficient to keep the membrane moist and liquid sulfur is removed from the anode chamber and water or hydrogen is removed from the cathode chamber and further characterized in that the catalytic anode is formed of carbon powder having catalyst deposited thereon by the sol-gel technique.

13. A process according to claim 12 characterized in that the catalyst is a metal selected from the group consisting of Mo, Co, Cu, Cr, W, Ni, Fe, Mn, or a combination thereof.

14. A process according to claim 13 characterized in that the metal is a metal sulfide.

15. A process according to claim 12 characterized in that the anode and cathode chambers are maintained at a temperature in the range of 125–165° C. and a pressure of at least 20 psi (0.14 MPa) sufficient to maintain the membrane in a moist state.

16. A process according to claim 12 characterized in that the carbon powder is treated with polytetrafluoroethylene.

* * * * *